United States Patent
Metzner

[11] Patent Number: 6,079,268
[45] Date of Patent: Jun. 27, 2000

[54] SERVO-DRIVEN ELEVATOR FOR DYNAMIC BALANCER

[75] Inventor: Robert E. Metzner, Gregory, Mich.

[73] Assignee: Balance Technology, Inc., Ann Arbor, Mich.

[21] Appl. No.: 08/903,503

[22] Filed: Jul. 30, 1997

[51] Int. Cl.[7] .................................................. G01M 1/06
[52] U.S. Cl. ............................................................ 73/462
[58] Field of Search .............................. 73/460, 462, 471, 73/487, 483; 198/341.04

[56] References Cited

U.S. PATENT DOCUMENTS

| | | | |
|---|---|---|---|
| 2,898,764 | 8/1959 | Kinsey et al. | 73/483 |
| 4,262,536 | 4/1981 | Orem et al. | 73/462 |
| 5,189,912 | 3/1993 | Quinlan et al. | 73/462 |

*Primary Examiner*—John E. Chapman
*Attorney, Agent, or Firm*—Benita J. Rohm; Raphael A. Monsanto

[57] ABSTRACT

The cycle times of an automatic single station residual unbalance measuring arrangement for a tire-wheel assembly are improved by the application of servo control to the vertical displacement drive of an elevator. Information relating to a particular tire-wheel type is obtained by direct measurement and/or correlation with data associated with predetermined tire-wheel types. A computer controls the operation of a servo motor that controls the vertical displacement of the tire-wheel assembly onto and off of a precision spindle and chuck on which the residual unbalance measurement is performed. The arrangement affords rapid acceleration onto and off of the precision spindle and chuck, but a gentle engagement between the wheel-tire assembly and the precision chuck to avoid tire bounce and damage to the precision balancer tooling.

20 Claims, 2 Drawing Sheets

FIG. 2

CYCLE TIMES WITH STANDARD ELEVATOR

| TASK | TIME | 1.0 | 2.0 | 3.0 | 4.0 | 5.0 | 6.0 | 7.0 | 8.0 | 9.0 | 10.0 | 11.0 | 12.0 | 13.0 | 14.0 |
|---|---|---|---|---|---|---|---|---|---|---|---|---|---|---|---|
| Convey Wheel In | 1.3 | | | | | | | | | | | | | | |
| Center Wheel | 0.5 | | | | | | | | | | | | | | |
| Lower Elevator | 3.0 | | | | | | | | | | | | | | |
| Expand Adapter Jaws | 0.5 | | | | | | | | | | | | | | |
| Measure Unbalance | 4.5 | | | | | | | | | | | | | | |
| Retract Adapter Jaws | 0.2 | | | | | | | | | | | | | | |
| Raise Elevator | 1.5 | | | | | | | | | | | | | | |
| Mark Unbalance Locations | 0.7 | | | | | | | | | | | | | | |
| Convey Wheel Out | 0.6 | | | | | | | | | | | | | | |
| TOTAL CYCLE TIME | 12.8 | | | | | | | | | | | | | | |

FIG. 3

CYCLE TIMES WITH SERVO CONTROLLED ELEVATOR

| TASK | TIME | 1.0 | 2.0 | 3.0 | 4.0 | 5.0 | 6.0 | 7.0 | 8.0 | 9.0 | 10.0 | 11.0 | 12.0 | 13.0 | 14.0 |
|---|---|---|---|---|---|---|---|---|---|---|---|---|---|---|---|
| Convey Wheel In | 1.3 | | | | | | | | | | | | | | |
| Center Wheel | 0.5 | | | | | | | | | | | | | | |
| Lower Elevator | 0.7 | | | | | | | | | | | | | | |
| Expand Adapter Jaws | 0.3 | | | | | | | | | | | | | | |
| Measure Unbalance | 4.5 | | | | | | | | | | | | | | |
| Retract Adapter Jaws | 0.2 | | | | | | | | | | | | | | |
| Raise Elevator | 0.7 | | | | | | | | | | | | | | |
| Mark Unbalance Locations | 0.7 | | | | | | | | | | | | | | |
| Convey Wheel Out | 0.6 | | | | | | | | | | | | | | |
| TOTAL CYCLE TIME | 9.5 | | | | | | | | | | | | | | |

SERVO-DRIVEN ELEVATOR FOR DYNAMIC BALANCER

BACKGROUND OF THE INVENTION

1. Field of the Invention

This invention relates generally to systems and arrangements for balancing rotatory elements, and more particularly, to arrangements and methods of installing rotatory elements, such as the tire-wheel assemblies of vehicles, on to a spindle for determining the magnitude and location of a residual unbalance.

2. Description of the Related Art

It is well known to measure dynamic unbalance of tire-wheel assemblies in a single station balance. It is desired, however, to maintain a cycle time of 10 seconds or less, which corresponds to the typical cycle time of known multi-station balance systems. Within the cycle duration, a tire-wheel assembly that has been placed on a belt conveyor at the input side of the balance station is driven by the belt conveyor on to an elevator assembly that has incorporated into a vertically translatable platform thereof a chain conveyor and a centering mechanism. The chain conveyor and the centering arms cooperate within one another whereby the centering arms communicate with the outer periphery of the tire-wheel assembly and reposition same so that the central bore thereof is directly over a measuring spindle tooling. The elevator then lowers the tire-wheel assembly onto the balance measuring tooling and continues the downward motion to a predetermined lowered position whereby the elevator platform does not interfere with the rotation of the tire-wheel assembly on the balance tooling.

In the known arrangement, the balance tooling grips the central wheel bore of the tire-wheel assembly, which then is rotationally accelerated until a predetermined speed is attained. The predetermined speed is maintained during measurement of the residual unbalance, and then the tire-wheel assembly is decelerated and its rotation ultimately is stopped at a particular angular position corresponding to the location of the unbalance. At this point, as the elevator is raised, the underweight position on the vehicle side of the tire-wheel assembly is marked with an ink marker that is mounted to the elevator. A further marker arranged above the conveyor is moved into position such that when the elevator is in its upward position, the underweight spot on the curb side of the tire-wheel assembly is also marked. The tire-wheel assembly is then ready to be unloaded as the chain conveyor arrangement concurrently brings the next tire-wheel assembly into position for unbalance measurement.

A time-consuming and therefore critical portion of the cycle duration is the time required by the elevator to lower the tire-wheel assembly on to the balance spindle. Such lowering must be effected within a fraction of a second, but the rate of travel must be quite slow when the tire-wheel assembly communicates with the balancer tooling. If the tire-wheel assembly moves too quickly as it is installed on the balancer spindle, the bearings of the spindle may be damaged, or the tire-wheel assembly may bounce causing same not to be fully seated when the wheel bore is gripped.

In prior art arrangements, the elevator was smoothly accelerated and decelerated by operation of a crank that would drive a connecting link to the elevator, thereby creating a sinusoidal speed curve as the elevator travels between the maximum upper and lower positions. Such a known arrangement is quite adequate for a single tire-wheel assembly type wherein the height of the elevator above the spindle of the balancer is predetermined with respect to the axial location of the bore of the tire-wheel assembly. However, most vehicle assembly plant balancers operate on a variety of tire-wheel assemblies, each having a different distance from the vehicle side of the tire, which rests on the elevator, to the mounting surface of the wheel in the region of the central bore. Such a differential in the distances requires changes in the point along the travel of the elevator at which each such wheel engages the balancer tooling, such differences oftentimes being different from one another by several inches. There is a need, therefore, for an arrangement that determines this distance and operates the elevator whereby same is slowed as it approaches the precise point that the various tire-wheel assembly types will communicate with the tooling of the balancer system. Preferably, such an improved system advantageously would lower each tire-wheel assembly slowly only near the point of contact between the tire-wheel assembly and the balancer tooling and would accelerate to significantly higher speeds both, above and below the point of balance tooling engagement. In addition, there is a need for an elevator drive arrangement that, after completion of the unbalance measuring procedure, raises the tire-wheel assembly in a controlled manner whereby bouncing is prevented as the tire-wheel assembly is picked up off the balancer tooling and as it is stopped at the uppermost position for conveyance.

In addition to the foregoing, there is a need for an arrangement that can determine the distance required to be traveled by the elevator arrangement in order to achieve controlled gentle communication between the tire-wheel assembly and the balancer tooling.

It is, therefore, an object of this invention to provide an arrangement that controls the operation of an elevator that readily can be adapted to lower and raise a variety of types of tire-wheel assemblies to and from balancer tooling with a controlled deceleration as the assembly is installed on the balancer tooling.

It is another object of this invention to provide an elevator arrangement for lowering and raising a plurality of types of tire-wheel assemblies in a dynamic balancing machine.

SUMMARY OF THE INVENTION

The foregoing and other objects are achieved by this invention which provides in a first apparatus aspect thereof, an elevator arrangement for raising and lowering at an unbalance measuring station a vehicle wheel of one of a plurality of predetermined vehicle wheel types. In accordance with the invention, the elevator arrangement is provided with a platform for supporting the vehicle wheel, the platform having a raised position and a plurality of lower positions. Each of the lower positions corresponds to a respectively associated one of the vehicle wheel types. A wheel type determining arrangement identifies the vehicle wheel type. A balancing spindle communicates with the vehicle wheel when the platform is in a lowered position, the lowered position being determined in response to the wheel type determining arrangement. Additionally, a platform drive system is coupled to the platform for translating the platform in response to the wheel type determining arrangement between the raised position and the plurality of lowered positions.

In a highly advantageous embodiment of the invention, the platform drive arrangement is formed of a servo drive that produces a servo rotatory motion that is characterized by an arcuate distance that is responsive to the wheel type determining system. Additionally, there is provided in this embodiment of the invention a platform coupler for converting the rotatory motion of the servo drive to a vertical translation of the platform.

In a specific embodiment, the servo drive includes a servo motor for producing the servo rotatory motion. In a specific illustrative embodiment of the invention, there is provided a rotatory motion reduces for converting the rotatory motion of the servo drive to a platform drive rotatory motion that is characterized by a platform drive arcuate distance having a fixed relationship to the servo drive arcuate distance. A drive linkage couples the rotatory motion reduces to the platform for translating the platform in response to the servo drive.

In such an arrangement, the coupler effects a non-linear drive relationship between the servo drive and the platform. That is, the vertical translation of the platform is not linearly related to the angular rotation of the servo drive.

In a further embodiment of the invention, there is provided a wheel type sensor for producing a wheel type information signal responsive to the type of the vehicle wheel. A controller provides to the servo drive a servo control signal responsive to the wheel type information signal for controlling the servo rotatory motion. A data storage arrangement stores information for effecting a calculation of a characteristic of the servo control system in response to the wheel type information signal. The wheel type sensor, in a specific illustrative embodiment of the invention, includes a height measuring device for incorporating in the wheel type information signal wheel hub height information that corresponds to the height of the hub of the vehicle wheel along the direction of travel of the elevator platform. The wheel type sensor may include, in certain embodiments, a diameter measuring device for incorporating in the wheel type information signal wheel diameter information corresponding to the diameter of the vehicle wheel. Alternatively, a weight measuring arrangement may be provided for incorporating in the wheel type information signal wheel weight information.

In accordance with a further apparatus aspect of the invention an arrangement for translating a vehicle tire-wheel assembly of one of a plurality of predetermined tire-wheel assembly types onto and off of a spindle for measuring unbalance of the vehicle wheel includes a wheel type identification arrangement for identifying the vehicle tire-wheel assembly type and producing a wheel identification signal. The arrangement further includes a wheel translation arrangement for translating the vehicle tire-wheel assembly axially, the extent of translation being responsive to the wheel type identification system.

In one embodiment of this further aspect of the invention, there is provided a wheel data storage arrangement for storing tire-wheel assembly information corresponding to a predetermined characteristic of each predetermined vehicle tire-wheel type and providing a wheel translation signal responsive to the wheel identification signal. The wheel translation arrangement includes, in this arrangement, a drive for producing an intermediate translation responsive to the wheel translation signal. The intermediate translation may be a rotatory motion, in some embodiments of the invention.

In a further embodiment of the invention, the wheel translation arrangement includes a non-linear translation conversion arrangement for converting the intermediate translation to an axial translation in accordance with a non-linear relationship between the intermediate translation and the axial translation. Such non-linearity may be, in one embodiment, a sinusoidal relationship. Modification of the wheel translation signal in response to the non-linear relationship between the intermediate translation and the axial translation is effected by an electronic processor.

In accordance with a method aspect of the invention, a method of determining a residual unbalance in a vehicle wheel includes the steps of:

determining a predetermined characteristic of the vehicle wheel;

forming a translation control signal in response to the step of determining;

activating a drive control arrangement in response to the translation control signal, whereby the vehicle wheel is installed on an unbalance measuring station; and measuring an unbalance of the vehicle wheel.

In one embodiment of this method aspect of the invention. the drive control arrangement in the step of activating has a non-linear drive characteristic. In a further embodiment, the step of determining includes the further step of measuring a predetermined characteristic of the vehicle wheel.

BRIEF DESCRIPTION OF THE DRAWINGS

Comprehension of the invention is facilitated by reading the following detailed description, in conjunction with the annexed drawing, in which:

FIG. 2 is a graphical representation of the time duration of the cycle sequence steps of an unbalance measuring system using a prior art elevator system; and FIG. 3 is a graphical representation of the duration of the various components of a cycle sequence employing a servo-driven elevator arrangement in accordance with the present invention.

DETAILED DESCRIPTION

Figure 1:
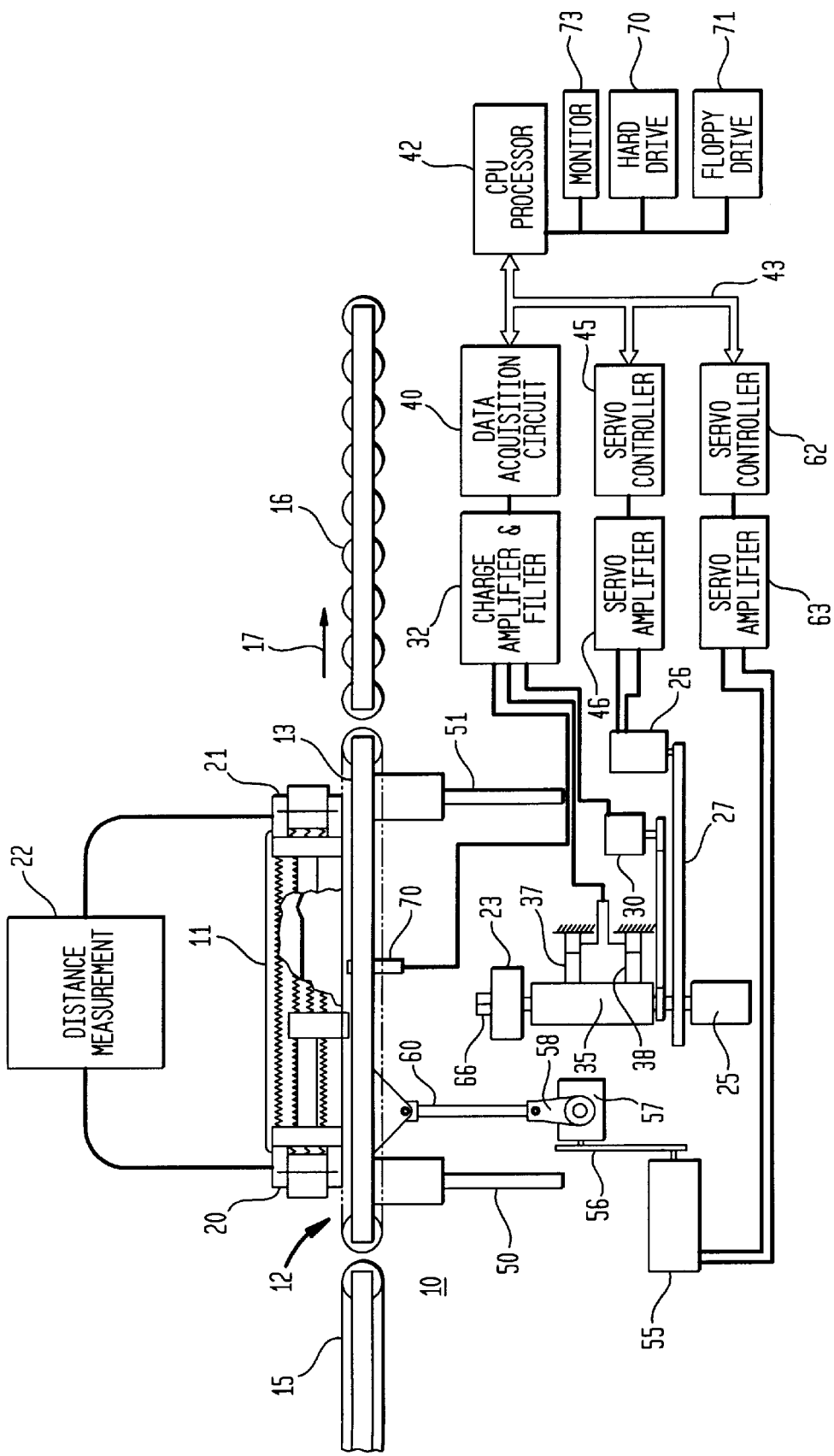
FIG. 1 is a simplified schematic and function block representation of a specific illustrative embodiment of the invention.

FIG. 1 is a simplified schematic and function block representation of a specific illustrative embodiment of the invention. In this figure, an elevator system under line 10 is shown to have a tire-wheel assembly 11 installed on an elevator platform 12, which in this specific illustrative embodiment of the invention, is in the form of a transfer conveyor 13 that receives the tire-wheel assembly from a load conveyor 15 and, after completion of the measurement of the residual unbalance in a tire-wheel assembly, transfer of same to an unload conveyor 16. Thus, tire-wheel assembly 11 is moved systematically in the direction of arrow 17.

In operation, tire-wheel assembly 11, after being deposited on transfer conveyor 13, is centered thereon by operation of illustratively four centering arms, two of which, centering arms 20 and 21, are shown in this figure. In a specific illustrative embodiment of the invention, the distance between centering arms 20 and 21 is measured by distance measuring arrangement 22, which produces an indication responsive to the diameter of tire-wheel assembly 11. The cintering arms ensure that the central bore (not shown) of the tire-wheel assembly is registered with an axis of rotation of a precision chuck 23 that has chuck jaws 66 axially arranged therewith. The precision chuck is axially coupled to a chuck actuator 25 and which is rotatable in response to a servo motor 26 which is coupled thereto by a drive belt 27. The rotation of precision chuck 23 is monitored by an encoder 30 that provides an electrical information signal to a charge amplifier and filter 32. The information signal contains data relating to the angular position of precision chuck 23.

Precision chuck 23 is installed on a precision spindle 35 that is mechanically coupled to a pair of force blocks 37 and 38. The force blocks provide electrical signals that represent the unbalance of the tire-wheel assembly, as will be described, and such information is conducted to charge amplifier and filter 32. Charge amplifier and filter 32 is connected to a data acquisition circuit 40, such data constituting a correlation of the unbalance forces characterized in the signals issued by force blocks 37 and 38 against angular position provided by the information contained in the signal issued by encoder 30. The data is transmitted to a CPU processor 42 via a bus system 43. The rotation of servo motor 26, which rotates precision chuck 23, is controlled by CPU processor 42 via bus system 43, a servo controller 45, and a servo amplifier 46.

Elevator 12 with tire-wheel assembly 11 thereon is urged up and down along guide slides 50 and 51 in response to the rotary motion of a servo motor 55. In this specific embodiment of the invention, servo motor 55 is coupled via a drive belt 56 to a reducing gear box 57 having a crank 58 at a rotatory output thereof Crank 58, therefore, rotates in response to the rotation of servo motor 55, but at a slower rate, thereby achieving a mechanical advantage. Crank 58 is coupled pivotally to a connecting link 60 that is coupled to elevator 12 at an uppermost end of the connecting link. Thus, as servo motor 55 is rotated, crank 58 also is rotated whereby elevator 12 is correspondingly displaced upward and downward, as the case may be. The rotation of servo motor 55 is controlled by CPU processor 42, via bus system 43, a servo controller 62, and a servo amplifier 63. Operating sequences, as will be described below, are stored in conventional hard and floppy drives 70 and 71, respectively, and the operating state of the overall system is made apparent to an operator (not shown) via a monitor 73.

FIGS. 2 and 3 are graphical representations of the time durations for performing sequential steps that constitute the overall cycle times with a conventional elevator (FIG. 2) and a servo controlled elevator (FIG. 3). The tasks to be performed during the cycle are as follows:

(1) Conveying tire-wheel assembly 11 onto transfer conveyor 13;

(2) Centering the tire-wheel assembly onto the elevator using centering arms 2 and 21;

(3) Lowering elevator 12 such that chuck jaws 66 (adapter jaws) of precision chuck 23 engage the central bore (not shown) of tire-wheel assembly 11;

(4) Expanding chuck jaws 66 on precision chuck 23 whereby the chuck jaws grip the central bore of the tire-wheel assembly (during this time, elevator 12 drops below precision chuck 23, whereby tire-wheel assembly 11 is off of the elevator and rotationally supported by the precision chuck);

(5) Measuring the residual unbalance by rotating the tire-wheel assembly on the precision chuck in response to actuation of servo motor 26 and correlating the unbalance forces measured by force blocks 37 and 38 against the angular position measured by encoder 30;

(6) Retracting chuck jaws 66 whereby the tire-wheel assembly is released;

(7) Raising elevator 12;

(8) Marking the unbalance locations on the tire-wheel assembly; and (9) Conveying the tire-wheel assembly off of elevator 12 and on to unload conveyor 16.

As shown in FIGS. 2 and 3, some of the cycle times associated with performing the operations hereinabove described are greatly shortened with the use of the inventive servo controlled elevator. For example, the centering of the tire-wheel assembly, the lowering of the elevator, the expanding of the adapter jaws, and the raising of the elevator are shortened, saving over three seconds.

Referring once again to FIG. 1, the elevator of the present invention is controlled in response to the particular type of tire-wheel assembly disposed on elevator 12. In this specific illustrative embodiment of the invention, an ultrasonic transducer 70 produces an electrical signal that is responsive to height of the central bore (not shown) of the tire-wheel assembly above the elevator platform. This signal is conducted to charge amplifier and filter 32 and the corresponding data is acquired in data acquisition circuit 40 and conducted to CPU processor 42. The processor then controls the operation of servo motor 55 whereby the tire-wheel assembly is lowered rapidly toward the precision chuck and then rapidly decelerated so as to be brought gently thereon. The gentle depositing of the tire-wheel assembly on to the precision chuck prevents tire bounce and extends spindle life. CPU processor 42 computes the acceleration and deceleration of the elevator, as well as the stopping points, notwithstanding that the vertical translation of the elevator in response to the rotation of crank 58 is a non-linear, substantially sinusoidal relationship.

The present invention is not limited to the use of a measurement system, such as ultrasonic translucent 70, to achieve identification of the tire-wheel assembly type. For example, since usually only a limited number of types of tire-wheel assemblies are processed in any given vehicle plant, the tire-wheel type may be determined from the overall diameter, width, or weight thereof The diameter may, for example, be determined in response to the positioning of centering arms 20 and 21. The width may, for example, be determined using a multi-beam light detector (not shown) installed on the conveyor. Also, a force sensor can be installed as appropriate to measure the weight of the tire-wheel assembly. In such an arrangement, the information relating to tire-wheel diameter or weight can be stored in one of drives 70 and 71 and correlated to a predetermined central bore height over precision chuck 23 whereby the operation of servo motor 55 and the up and down translation of elevator 12 is correspondingly controlled.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An elevator arrangement for raising and lowering at an unbalance measuring station a vehicle wheel of one of a plurality of predetermined vehicle wheel types, the elevator arrangement comprising:

a platform for supporting the vehicle wheel, said platform having a raised position and a plurality of lowered positions, each lowered position corresponding respectively to an associated one of the plurality of vehicle wheel types;

a wheel type determining arrangement for identifying the vehicle wheel type of the vehicle wheel;

a spindle for communicating with the vehicle wheel when said platform is in a lowered position determined in response to said wheel type determining arrangement; and a platform drive coupled to said platform for translating said platform in response to said wheel type determining arrangement between the raised position and the plurality of lowered positions.

2. The elevator arrangement of claim 1, wherein said platform drive comprises:

a servo drive for producing a servo rotatory motion characterized by a servo drive arcuate distance responsive to said wheel type determining arrangement; and a platform coupler for converting the rotatory motion of said servo drive to a vertical translation of said platform.

3. The elevator arrangement of claim 2, wherein said servo drive comprises a servo motor.

4. The elevator arrangement of claim 2, wherein said platform coupler comprises:

a rotatory motion reducer for converting the rotatory motion of said servo drive to a platform drive rotatory motion characterized by a platform drive arcuate distance having a fixed relationship to the servo drive arcuate distance; and a drive linkage for coupling said rotatory motion reducer to said platform for translating said platform in response to said servo drive.

5. The elevator arrangement of claim 4, wherein said platform coupler effects a non-linear drive relationship between said servo drive and said platform.

6. The elevator arrangement of claim 2, wherein said wheel type determining arrangement is provided with a wheel type sensor for producing a wheel type information signal responsive to the type of the vehicle wheel; and there is further provided a controller for providing to said servo drive a servo control signal responsive to the wheel type information signal, that controls the servo rotatory motion.

7. The elevator arrangement of claim 6, wherein there is further provided data storage arrangement for storing information for effecting a calculation of a characteristic of the servo control signal in response to the wheel type information signal.

8. The elevator arrangement of claim 6, wherein said wheel type sensor comprises a height measuring arrangement for incorporating in the wheel type information signal wheel hub height information corresponding to the height of a hub of the vehicle wheel.

9. The elevator arrangement of claim 6, wherein said wheel type sensor comprises diameter measuring arrangement for incorporating in the wheel type information signal wheel diameter information corresponding to the diameter of the vehicle wheel.

10. The elevator arrangement of claim 6, wherein said wheel type sensor comprises a diameter measuring arrangement for incorporating in the wheel type information signal wheel weight information corresponding to the weight of the vehicle wheel.

11. An arrangement for translating a vehicle wheel of one of a plurality of predetermined vehicle wheel types onto and off of a spindle for measuring unbalance of the vehicle wheel, the arrangement comprising:

wheel type identification arrangement for identifying the vehicle wheel type of the vehicle wheel and producing a wheel identification signal; and a wheel translation arrangement for translating the vehicle wheel axially, the extent of translation being responsive to said wheel type identification arrangement.

12. The arrangement of claim 11, wherein there is further provided a wheel data storage arrangement for storing wheel information corresponding to a predetermined characteristic of each predetermined vehicle wheel type and providing a wheel translation signal characterized by the wheel information responsive to the wheel identification signal.

13. The arrangement of claim 12, wherein said wheel translation arrangement comprises a drive for producing an intermediate motion responsive to said wheel translation signal.

14. The arrangement of claim 13, wherein said intermediate motion is a rotatory motion of said drive.

15. The arrangement of claim 13, wherein said wheel translation arrangement further comprises a non-linear translation converter for converting the intermediate motion to an axial translation in accordance with a non-linear relationship between the intermediate motion and the axial translation.

16. The arrangement of claim 15, wherein the non-linear relationship between the intermediate motion and the axial translation is a sinusoidal relationship.

17. The arrangement of claim 15, wherein there is further provided a processor for modifying the wheel translation signal in response to the non-linear relationship between the intermediate motion and the axial translation.

18. A method of determining an unbalance in a vehicle wheel, the method comprising the steps of:

determining a predetermined characteristic of the vehicle wheel;

forming a translation control signal in response to said step of determining;

activating a drive control arrangement in response to the translation control signal, whereby the vehicle wheel is installed on an unbalance measurement station; and measuring an unbalance of the vehicle wheel.

19. The method of claim 18, wherein the drive control arrangement in said step of activating produces a non-linear motion.

20. The method of claim 18, wherein said step of determining comprises the further step of measuring a predetermined characteristic of the vehicle wheel.

* * * * *